United States Patent Office 3,562,281
Patented Feb. 9, 1971

3,562,281
BIS-PIPERIDYL-ALKANES
Lincoln Harvey Werner, Summit, and Robert Paul Mull,
Florham Park, N.J., assignors to Ciba Corporation,
Summit, N.J., a corporation of Delaware
No Drawing. Continuation-in-part of application Ser. No.
686,827, Nov. 30, 1967, which is a continuation-in-part
of application Ser. No. 612,357, Jan. 30, 1967. This
application June 26, 1969, Ser. No. 836,992
Int. Cl. C07d 29/36
U.S. Cl. 260—293.4
9 Claims

ABSTRACT OF THE DISCLOSURE

Basically substituted bis-piperidyl-alkanes, e.g. those of the formula

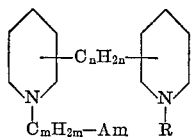

$n=1–7$, $m=2–7$
Am=sec. or tert. amino group
R=H, aliphatic, araliphatic
or aromatic radical acyl derivatives, quaternaries and salts thereof are antibacterial and antiparasitic agents.

CROSS-REFERENCES TO RELATED APPLICATIONS

This is a continuation-in-part of application Ser. No. 686,827, filed Nov. 30, 1967, which in turn is a continuation-in-part of application Ser. No. 612,357, filed Jan. 30, 1967 (now abandoned).

SUMMARY OF THE INVENTION

The present invention concerns and has for its object the provision of new basically substituted bis-piperidyl-alkanes, more particularly those of Formula I

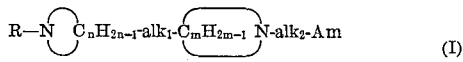

wherein each of $alk_1$ and $alk_2$ is lower alkylene, the latter of which separates Am from the nitrogen atom by at least 2 carbon atoms, each of $C_nH_{2n}$ and $C_mH_{2m}$ is alkylene forming with the nitrogen atom a 6-membered ring, wherein each of the $n$ and $m$ is an integer from 5 to 10, Am is a secondary or tertiary amino group and R is hydrogen, an aliphatic, araliphatic or aromatic radical, acyl derivatives, quaternaries and salts thereof, as well as of the corresponding pharmaceutical compositions and of methods for the preparation of these products. Said compositions are useful as antibacterial and antiparasitic agents, for example, in the treatment of tuberculosis, Chagas' disease and tapeworm infestations.

DESCRIPTION OF THE PREFERRED EMBODIMENTS

A lower alkylene radical $alk_1$ is preferably 1,2-ethylene or advantageously 1,3-propylene, but may also be, for example, methylene, 1,1-ethylene, 1,1-, 1,2- or 2,2-propylene, 2-methyl-1,2- or -1,3-propylene, 1,1-, 1,2-, 2,2-, 1,3- or 1,4-butylene, 2,3-, 2,4- or 1,5-pentylene, 1,4-, 2,4- or 1,6-hexylene or 2,6-heptylene. The lower alkylene radical $alk_2$ is, for example, also one of those groups listed for $alk_1$, provided it separates the adjacent nitrogen atoms by at least 2 carbon atoms; it stands preferably for 1,2-ethylene, 1,2- or 1,3-propylene. The term "lower," referred to above and hereinafter in connection with organic radicals or compounds respectively, defines such with up to 7, preferably up to 4, carbon atoms.

The ring-moieties $C_nH_{2n}$ and $C_mH_{2m}$ preferably stand for 1,5-pentylene, but may also represent, for example, 2- or 3-methyl- or -ethyl-1,5-pentylene, 2,4-dimethyl-1,5-pentylene, 1,5-hexylene, 2,6-heptylene, 1,5-octylene, 3,7-nonylene or 3,7-decylene.

The amino group Am is a secondary or preferably a tertiary amino group, substituted, for example, by aliphatic, cycloaliphatic or araliphatic hydrocarbon radicals. Preferred amino groups Am are mono- or di-lower alkylamino, Ph-lower alkylamino, N-lower alkyl-N-Ph-lower alkylamino, mono- or bicyclic lower alkyleneimino (or N-aza-cycloalkyl or -bicycloalkyl respectively) or monocyclic, lower monoaza-, -oxa- or -thiaalkyleneimino, wherein Ph represents phenyl, (lower alkyl)-phenyl, (lower alkoxy)-phenyl, (halogeno)-phenyl, (trifluoromethyl)-phenyl, (lower alkanoyl)-phenyl, (nitro)-phenyl, (di-lower alkylamino)-phenyl or (sulfamoyl-phenyl, e.g. mono- or dimethylamino, N-methyl-N-ethylamino, mono- or diethylamino, mono- or di-n- or i-propylamino, mono- or di-n-butylamino; benzylamino, N-methyl-N-benzylamino, 1- or 2-phenethylamino, N-ethyl-N-(1- or 2-phenethyl)-amino; pyrrolidino, piperidino, 1,4-pentyleneimino, 2,5- or 1,6-hexyleneimino or 2,6-heptyleneimino; 2-aza-2-bicyclo[2,2,1]heptyl, 2-aza-2-bicyclo[2,2,2] or [3,2,1] octyl, 3 - aza-3-bicyclo[3,2,1] or [3,3,0]octyl, 2-aza-2-bicyclo[3,2,2] or [3,3,1]nonyl, 3-aza-3-bicyclo[3,2,2] or [3,3,1]nonyl, 2-aza-2-, 3-aza-3-, 7-aza-7- or 8-aza-8-bicyclo[4,3,0]nonyl or 2-aza-2- or 3-aza-3-bicyclo [4,4,0]decyl; piperazino, N-lower alkyl-piperazino, 3-aza - 1,6 - hexyleneimino, 3-lower alkyl-3-aza-1,6-hexyleneimino, 4-aza-1,7-heptyleneimino or 4-lower alkyl-4-aza-1,7-heptyleneimino; morpholino, 3,5-dimethylmorpholino or thiamorpholino. One of the alkyls in a di-lower alkylamino group Am may also be connected with the lower alkylene chain $alk_2$, to form preferably a 5- or 6-membered ring; accordingly Am also represents N-lower alkylmonoaza-cyclo-alkyl.

An aliphatic radical R is, for example, lower alkyl, e.g. methyl, ethyl, n- or i-propyl, -butyl, -pentyl, -hexyl or -heptyl, 3 to 7 ring-membered cycloalkyl or cycloalkyl-lower alkyl, e.g. cyclopropyl, cyclopentyl or cyclohexyl, cyclopropylmethyl, cyclopentylmethyl, cyclohexylmethyl, 1- or 2-cyclopentylethyl. It is unsubstituted or substituted, preferaby by an amino group, e.g. the above-defined Am, free or functionally converted hydroxy or mercapto, such as lower alkoxy or alkylmercapto, e.g. that specified above, or acyl, such as lower alkanoyl or Ph-lower alkanoyl, e.g. acetyl, propionyl, butyryl or pivalyl, benzoyl or phenylacetyl, or Hc-lower alkanoyl, in which Hc stands for pyridyl, (lower alkyl)-pyridyl, furyl, (lower alkyl)-furyl, (nitro)-furyl, thienyl, (lower alkyl) thienyl, (nitro)-thienyl, thiazolyl, (lower alkyl)-thiazolyl, (nitro)-thiazolyl, 1,3,5-triazinyl or (4-amino-6-phenyl-amino)-2-1,3,5-triazinyl, e.g. nicotinoyl, furoyl or thienoyl. Preferred substituted aliphatic radicals R are Am-$alk_2$-, Ph-CO-$alk_1$- or Hc-CO-$alk_1$-.

An araliphatic or aromatic radical R is preferably mono- or bicyclic, carbocyclic or aza-, oxa- and/or thia-cyclic aryl-lower alkyl or aryl. These radicals are unsubstituted or substituted, preferably in the aromatic portion, by one or more, preferably 1-3, of the following radicals: lower alkyl, e.g. methyl, ethyl, n- or i-propyl or -butyl, free or functionally converted hydroxy or mercapto, such as lower alkoxy or alkylmercapto, e.g. methoxy, ethoxy, n- or i-propoxy or -butoxy, methyl- or ethylmercapto, 3 to 7 ring-membered cycloalkoxy or cycloalkylmercapto, e.g. cyclopropoxy, cyclopentoxy or cyclohexylmercapto, halogeno, e.g. fluoro, chloro or bromo, trifluoromethyl, lower alkanoyl, e.g. formyl, acetyl, propinyl, butyryl or pivalyl, cyano, carbamoyl, carboxy, lower carbalkoxy, sulfamoyl, nitro, amino, such as di-lower alkylamino or lower alkanoylamino, e.g. dimethylamino, diethylamino or acetylamino, aryloxy and/or arylmercapto, e.g. Ph-O- or Ph-S-. Preferred araliphatic or aromatic radicals are Ph-alk$_1$-, Hc-alk$_1$-, Ph or Hc, e.g. benzyl, halogenobenzyl, 1- or 2-phenethyl, pyridylmethyl, furfuryl, thenyl or 4-amino-6-phenylamino-1,3,5-triazinyl - 2 - methyl; phenyl, halogenophenyl, acetylphenyl, naphthyl, pyridyl, furyl, thienyl, thiazolyl or 5-nitro-2-thiazolyl.

The acyl derivatives of the invention are those derived from aliphatic, araliphatic or aromatic carboxylic, carbothioic or sulfonic acids, which are unsubstituted or substituted as shown above for the radicals R. Preferred acyl derivatives of the invention are those derived from the compounds of Formula I, in which R is hydrogen and the acyl radical (substituting said hydrogen atom) stands for unsubstituted lower alkanoyl, e.g. that mentioned above, or corresponding thioalkanoyl, or these radicals, especially formyl, substituted by mono-, bi- or tricyclic 3 to 7 ring-membered cycloalkyl, cycloalkoxy or cycloalkylmercapto, lower alkoxy, aralkoxy, aralkylmercapto, aryloxy, arylmercapto, halogeno, amino and/or aryl, such as cyclopropylformyl, cyclobutylformyl, cyclopentylformyl, cyclohexylformyl, norbornanylformyl, adamantylformyl or cyclopentylacetyl; cyclopentoxyacetyl, cyclohexylmercaptoacetyl; methoxyformyl, ethoxyformyl, ethoxyacetyl or β-methoxy-propionyl; Ph-alk$_1$ - O-lower alkanoyl or Ph-alk$_1$-S-lower alkanoyl, e.g. benzyloxyformyl, benzyloxyacetyl or benzylmercaptoacetyl; Ph-O- lower alkanoyl or Ph-S- lower alkanoyl, e.g. phenoxyformyl, phenoxyacetyl or phenylmercaptoacetyl; mono- or di-halogeno-lower alkanoyl, e.g. mono- or dichloroacetyl or β-mono- or -dichloro-propionyl; Am-lower alkanoyl or -thioalkanoyl, e.g. lower alkylcarbamoyl or -thiocarbamoyl, lower carbalkoxy-lower alkylcarbamoyl or -thiocarbamoyl, 3 to 7 ring-membered cycloalkylcarbamoyl, Ph-lower alkanoyl, Hc-lower alkanoyl, Ph-carbamoyl, Ph-thiocarbamoyl, Hc-carbamoyl, Hc-thiocarbamoyl, Ph-sulfonyl or Hc-sulfonyl, such as glycyl, β-dimethylaminopropionyl, β - (4 - methyl-piperazino)-propionyl, benzoyl, mono- or diphenylacetyl, nicotinoyl, isonicotinoyl, furoyl, thienoyl, but also naphthoyl or naphthylsulfonyl, especially phenyl-lower alkanoyl, -carbamoyl or -sulfonyl, (lower alkyl)-phenyl-lower alkanoyl, -carbamyl or -sulfonyl, (mono-, di- or tri-lower alkoxy)- phenyl- lower alkanoyl, -carbamoyl or -sulfonyl, (mono-, di- or tri-halogeno) - phenyl - lower alkanoyl, -carbamoyl or -sulfonyl, (trifluoro-methyl) - phenyl - lower alkanoyl, -carbamoyl or -sulfonyl, (mono- or di-lower alkanoyl)-phenyl-lower alkanoyl, -carbamoyl or -sulfonyl, (mono- or di-nitro)-phenyl-lower alkanoyl, -carbamoyl or -sulfonyl, (amino)-phenyl - lower alkanoyl, -carbamoyl or -sulfonyl, (lower alkanoylamino) - phenyl - lower alkanoyl, -carbamoyl or -sulfonyl or (sulfamoyl)-phenyl-lower alkanoyl, -carbamoyl or -sulfonyl, in which the lower alkanoyl moiety preferably contains 1 or 2 carbon atoms, such as formyl or acetyl.

The quaternaries of the invention are preferably lower alkyl or aralkyl, e.g. Ph-lower alkyl, quaternaries.

The compounds of the invention exhibit valuable pharmacological properties. Apart from hypotensive and the coronary blood flow increasing effects, they show primarily antibacterial and antiparasitic activity, for example, such against mycobacteria, trypanosoma and helminths, such as *M. tuberculosis, Trypanasoma cruzi* or tapeworms, e.g. *Hymenolepis nana,* as can be demonstrated in in vitro or animal tests using mammals, for example mice, dogs and sheep as test objects. In the trypanosoma-mice tests, the following strains of *Trypanosoma cruzi* can be used: (1) "Brasil," a cardiotropic strain which kills all untreated mice in about 30 days with a moderate parasitemia; (2) "Peru," also a cardiotropic strain, but more virulent, killing all untreated mice in about 20 days, with high parasitemias; (3) "Tulahuen," a reticulotropic strain from Chile, which kills all untreated mice in about 20 days, with a relatively low parasitemia. Ordinarily the infecting dose with each of the above strains may be about 50,000 parasites per animal, the inoculum being prepared from the blood of a previously infected mouse. A number of different treatment regimens can be used, some in which medication with the compounds of the invention is begun on the day after infection and continued for 1 to 3 weeks, others in which treatment is delayed for 1 or 2 weeks, and then medication is given as a single dose or daily for a one-week period. The compounds of the invention can be applied enterally or parenterally, e.g. orally or subcutaneously, for example in the form of solutions or suspensions in water and/or N,N-dimethylacetamide, at a dose level between about 0.5 and 300 mg./kg./day, preferably between about 1 and 100 mg./kg./day, advantageously between about 5 and 50 mg./kg./day, whereby usually the oral dose is at the higher and the parenteral dose at the lower level. After medication, the percentage of survivors is estimated and compared with that of untreated animals, e.g. mice. Besides their above-mentioned utility, the compounds of the invention are also useful as intermediates in the preparation of other valuable products, preferably of pharmacologically active compounds.

Preferred are those compounds of Formula I in which alk$_1$ is methylene, 1,2-ethylene or 1,3-propylene, alk$_2$ is 1,2-ethylene, 1,2- or 1,3-propylene, each of $C_nH_{2n}$ and $C_mH_{2m}$ is 1,5-pentylene, Am is di-lower alkylamino, Ph-lower alkylamino, N-lower alkyl-N-Ph-lower alkylamino, lower alkyleneimino or lower mono-aza-, -oxa- or thiaalkyleneimino and R is hydrogen, lower alkyl, 3 to 7 ring-membered cycloalkyl or cycloalkyl-lower alkyl, Am-alk$_2$, Ph-CO-alk$_1$, Hc-CO-alk$_1$, Ph-alk$_1$, Hc-alk$_1$, Ph, Hc, lower alkanoyl, 3 to 7 ring-membered (cycloalkyl, cycloalkoxy or cycloalkylmercapto)-lower alkanoyl, lower alkoxy-lower alkanoyl, Ph-alk$_1$-O-lower alkanoyl or Ph-alk$_1$-S-lower alkanoyl, Ph-O-lower alkanoyl, Ph-S-lower alkanoyl, mono- or dihalo-lower alkanoyl, Am-lower alkanoyl or -thioalkanoyl, 3 to 7 ring-membered cycloalkylcarbamoyl or -thiocarbamoyl, Ph-lower alkanoyl, Hc-lower alkanoyl, Ph-carbamoyl, Ph-thiocarbamoyl, Hc-carbamoyl, Hc-thiocarbamoyl, Ph-sulfonyl or Hc-sulfonyl, in which compounds Ph and Hc have the above-given meaning, and acid addition salts thereof.

Particularly useful are compounds of the Formula II

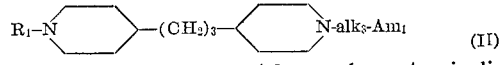

in which alk$_3$ is, 1,2-ethylene or 1,3-propylene, Am is di-lower alkylamino, benzylamino, N-lower alkyl-N-benzylamino, or 5 to 6 ring-membered lower alkyleneimino, and R$_1$ is hydrogen, lower alkyl, alk$_3$-Am, benzyl, halogenobenzyl, 4-amino - 6-phenylamino - 1,3,5 - triazinyl-2-methyl, phenyl, halogenophenyl, acetylphenyl, 5 - nitro-2-thiazolyl, 3 to 7 ring - membered cycloalkylmethyl, -formyl or -carbamoyl, lower alkanoyl, mono- or dihalogeno-lower alkanoyl, phenoxy - lower alkanoyl, phenylmercapto - lower alkanoyl, phenyl - lower alkanoyl, -carbamoyl or -sulfonyl, (lower alkyl)-phenyl - lower alkanoyl, -carbamyl or -sulfonyl, (mono-, di- or tri-lower alkoxy)-phenyl - lower alkanoyl, -carbamoyl or -sulfonyl, (mono-, di- or trihalogeno) - phenyl-lower alkanoyl, -carbamoyl or -sulfonyl, (trifluoromethyl) - phenyl-lower alkanoyl, -carbamoyl or -sulfonyl, (mono- or di-lower alkanoyl)-phenyl-lower alkanoyl, -carbamoyl or -sulfonyl, (mono- or di-nitro) - phenyl-lower alkanoyl, -carbamoyl or -sulfonyl, (amino) - phenyl-lower alkanoyl, -carbamoyl or -sulfonyl, (lower alkanoylamino - phenyl-lower alkanoyl, -carbamoyl or -sulfonyl or (sulfamoyl)-phenyl - lower alkanoyl, -carbamoyl or -sulfonyl, in which the lower alkanoyl moiety preferably contains 1 or 2 carbon atoms, naphtoyl, isonicotinoyl, furoyl, 5-nitro - 2-furoyl or thienoyl, or therapeutically acceptable acid addition salts thereof, which, when given at a dose between about 5 and 50 mg./kg./day subcutaneously or intraperitoneally, or between about 1 and 100 mg./kg./day orally to mice, show outstanding activity against *Trypanosoma cruzi*.

Outstanding are the compounds of Formula II, in which $alk_3$ is 1,3-propylene, $Am_1$ is N-(methyl, ethyl, n-propyl, n-butyl or benzyl)-N-methylamino and $R_1$ is phenyl mercaptoacetyl, benzoyl, 4-fluorobenzoyl, phenylcarbamoyl, 4 - fluorophenylcarbamoyl or 2-furoyl or therapeutically acceptable acid addition salts thereof.

The compounds of the invention are prepared according to methods in themselves known. For example, the process for their preparation consists in:

(a) Reacting a reactive ester of the alcohol having the formula

or a reactive condensation product thereof, with the amine Y–H, in which one of X and Y stands for amino or Am- and the other for

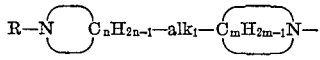

or an acyl derivative of these compounds, or (b) Reducing a compound of the formula

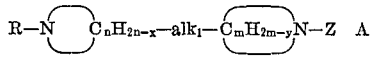

or an acyl derivative thereof, in which $alk_4$ is $alk_1$ or a group convertible by reduction into $alk_1$, Z is $alk_2$-Am or a group convertible by reduction into amino-lower alkyl, each of $x$ and $y$ is one of the integers 1 and 6 and A is an anion in case $x$ and/or $y$ is 6, at least one of $alk_4$, Z, $x$ and $y$ being different from $alk_1$, $alk_2$-Am and 1 respectively, and converting any resulting compound, containing a group different from Am attached at $alk_2$, into that of Formula I and, if desired, converting any resulting compound into another compound of the invention.

A reactive ester of the alcohol mentioned under item (a) is, for example, such derived from a mineral, such as a hydrohalic, sulfuric or phosphoric acid, e.g. hydrochloric or hydrobromic acid, or from a sulfonic acid, such as an alkane- or benzenesulfonic acid, e.g. methane-, ethane- or p-toluenesulfonic acid. A reactive condensation product thereof is, for example, the cyclic product which results from said ester by splitting off the acid, e.g. the compound

in which Im is imino or such group corresponding to Am, preferably unsubstituted or correspondingly N-substituted ethyleneimino.

A group $alk_4$ convertible into $alk_1$ is, for example, lower alkenylene, lower alkynylene, lower oxo-alkylene or free or esterified lower hydroxy-alkylene. The group Z is preferably one of the formulae:

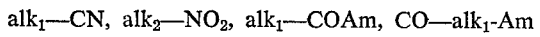

lower iminoalkylene or oximinoalkylene. In case $x$ and/or $y$ is 6, the cyclic moiety is an unsubstituted or alkylated pyridinium radical. The corresponding starting material is reduced according to conventional methods. For example, the ketones may advantageously be reduced with hydrogen or reducing agents, for example according to the Clemmensen or Wolff-Kishner procedure, e.g. by reduction with nascent hydrogen, preferably generated from amalgamated zinc and acids, advantageously hydrochloric acid, or with hydrazines in the presence of alkaline agents, respectively, preferably hydrazine in the presence of alkali metal hydroxides or alkoxides and high-boiling water-miscible solvents, e.g. lower alkylene glycols or polyglycols. The unsaturated compounds, alcohols and esters, particularly the halides, the nitriles, nitro compounds, Schiff's bases or oximes are preferably reduced with the use of catalytically activated or nascent hydrogen, e.g. hydrogen in the presence of nickel, palladium or platinum catalysts. The halides, nitriles and amides may also be reduced with complex light metal hydrides, such as lithium aluminum hydride or sodium borohydride. These compounds, preferably the halides, may also be reacted with organometallic compounds, such as zinc alkyls or corresponding Grignard reagents, if necessary followed by hydrolysis.

The compounds so obtained may contain a group different from Am linked with $alk_2$, for example, free or acylated primary amino. They are converted into the secondary or tertiary amines or quaternaries of the invention, for example, by hydrolysis of the acylated primary amines, e.g. with the use of acidic or alkaline agents, such as aqueous mineral and/or lower alkanoic acids or alkali metal hydroxides; in case of phthaloylamines also with hydrazine. Resulting prim. or sec. amines are N-substituted, for example, with the use of reactive esters of corresponding alcohols or phenols, preferably lower alkyl or aralkyl halogenides or Ph-F, analogous to reaction (a), or by reductive alkylation, i.e. reaction with a corresponding carbonyl compound in the presence of a reducing agent, preferably catalytically activated hydrogen, formic acid or its derivatives, e.g. ammonium salts. Secondary amines, especially those of Formula I in which R stands for hydrogen, can be acylated, preferably with the use of the corresponding reactive functional acid derivatives, e.g. halides, simple or mixed anhydrides, azides, isocyanates, isothiocyanates, imidazolides, isoxazolides or activated esters, e.g. the cyanomethyl, carboxymethyl, p-nitrophenyl, 2,4,5-trichlorophenyl, pentachlorophenyl, N - hydroxysuccin-or-phthalimide ester, or with the use of the free acids in the presence of a condensation agent, preferably such used in peptide synthesis, such as carbodiimides, e.g. dicyclohexylcarbodiimide or N,N - diimidazolyl-carbonyl. Resulting acyl derivatives may be subjected to hydrolysis or hydrazinolysis as shown above, benzylamines to hydrogenolysis and the like.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Reactive esters of the alcohols are advantageously reacted with an excess of the corresponding amines or in the presence of other condensing agents, preferably alkali metal carbonates or bicarbonates or tertiary nitrogen bases, such as trialkylamines, N,N-dialkyl-anilines or pyridines.

The compounds of the invention are obtained as free bases or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, such as hydrohalic, e.g. hydrochloric or hydrobromic acid, sulfuric, phosphoric, nitric or perchloric acid, aliphatic, alicyclic, araliphatic, aromatic or heterocyclic carboxylic or sulfonic acids, such as formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, secondary amines may be used in the form of their alkaline metal salts or basic reactants in the form of their acid addition salts. Carbamoyl compounds may also be prepared stepwise, i.e. by reaction of the secondary amine with phosgene, followed by the treatment with the corresponding amine. Mainly, those starting materials should be used in the reactions of the invention that lead to the formation of those compounds indicated above as being specially valuable.

The starting material used is known or, if new, may be prepared according to known methods. Thus, for example, that mentioned under item (a) can be prepared by oxidation of picolines or by condensation of lithium or potassium alkyl-pyridines, e.g. picolines, with a halogen-pyridine, a halogenalkyl-pyridine or a di-halogen-alkane, if desired in liquid ammonia and in the presence of ferric oxide. The resulting bis-pyridyl-alkanes are then subjected to hydrogenation in the presence of palladium catalysts and, if desired, to further reaction with an alkylene halohydrin. Resulting alcohols may then be esterified, for example, with a halogenating or sulfonating agent, e.g. thionyl chloride, phosphorus oxychloride or pentabromide or p-toluenesulfonyl chloride. The starting material mentioned under item (b) can be prepared analogous to the reaction shown under (a) but using instead of the X-alk$_2$-OH esters reactive derivatives of the corresponding Z-alcohols or acids. In case the lithium or potassium picolines are reacted with polyhalogen alkanes, phosgen, dihalogeno-alkanones or nicotinic acid halides, and the resulting compounds hydrogenated and dehydrohalogenated, if desired after protecitcn of any oxo group by ketalization, e.g. with ethylene glycol, followed by addition of the Z moiety analogous to item (a), the starting material is obtained in which alk$_4$ is different from alk$_1$. The pyridinium starting material can be obtained either by reacting said lithium or potassium picolines with Z-substituted piperidyl or piperidylalkyl halogenides or by quaternizing corresponding bis-pyridyl-alkanes with reactive esters or corresponding Z-alcohols, if desired, followed by partial hydrogenation, e.g. with catalytically activated hydrogen. Most of the starting material used is also described in U.S. Pats. Nos. 2,624,736, 3,101,340, 3,352,870, 3,352,872 and 3,352,874.

The compounds of the invention can be used, for example, for the manufacture of pharmaceutical or veterinary compositions, containing them in conjunction or admixture with inorganic or organic, solid or liquid carriers suitable for enteral or parenteral administration. Suitable carriers for said compositions are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols or glycols. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers, and may further contain other therapeutically valuable substances. Said compositions are prepared by conventional methods and contain about 0.1 to 75%, more particularly 1 to 50%, of the active ingredient.

The following examples are intended to illustrate the invention and are not to be construed as being limitations thereon. Temperatures are given in degrees centigrade, and all parts wherever given are parts by weight. The thin layer chromatograms are made on silicagel GF$_{254}$ (Merck AG) according to E. Stahl, Thin Layer Chromatography, 1965. The $R_{cm}$ value is defined as follows: $R_{cm} = 15\ Rf$.

EXAMPLE 1

6.3 g. 1,3-bis-(4-piperidyl)-propane are added to 116 ml. of a 6.6% solution of 2-dimethylamino-ethyl chloride in toluene (i.e. 66 mg./ml.) and the mixture is stirred and refluxed overnight. It is cooled, filtered, the filtrate evaporated in vacuo, the residue dissolved in ethyl acetate, the solution filtered and the filtrate acidified with a saturated solution of hydrogen chloride in ethyl acetate. The precipitate formed is filtered off, washed with diethyl ether and recrystallized from methanol-diethyl ether to yield the 1,3-bis-[N-(2-dimethylamino-ethyl)-4-piperidyl]-propane tetrahydrochloride of the formula

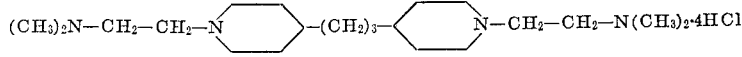

melting at 320–325°.

EXAMPLE 2

6.3 g. 1,3-bis-(4-piperidyl)-propane are added to 90 ml. of a 9.9% solution of 2-diethylamino-ethyl chloride in toluene and the mixture is stirred and refluxed overnight. It is cooled, filtered, the filtrate evaporated in vacuo, the residue taken up in ethyl acetate, the solution acidified with hydrogen chloride in ethyl acetate, the precipitate formed filtered off and recrystallized from methanol-diethyl ether to yield the 1,3-bis-[N-(2-diethylamino-ethyl) 4-piperidyl]-propane tetrahydrochloride of the formula

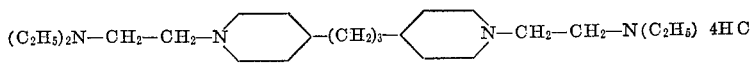

melting at 271–273°.

Example 3

19 g. 1,3-bis-(4-piperidyl)-propane are added to 225 ml. of a 7.1% solution of 3-dimethylamino-propyl chloride and the mixture is refluxed and stirred overnight. It is cooled to room temperature, filtered, the filtrate evaporated in vacuo and the residue dissolved in ethyl acetate. The solution is filtered, the filtrate acidified with hydrogen chloride in ethyl acetate, the precipitate formed filtered off and recrystallized from ethanol to yield the 1,3-bis-

[N - (3 - dimethylamino - propyl) - 4-piperidyl]-propane tetrahydrochloride of the formula

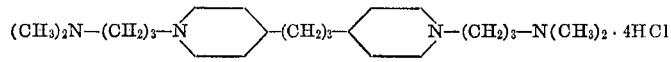

melting at 322–323°.

Example 4

The mixture of 21 g. 1,3-bis-(4-piperidyl)-propane, 45 g. 3-diethylamino-propyl chloride and 250 ml. of toluene is refluxed for 20 hours while stirring. It is filtered at room temperature, the filtrate evaporated in vacuo, the residue dissolved in ethyl acetate, the solution filtered and the filtrate strongly acidified with hydrogen chloride in ethyl acetate. The precipitate formed is filtered off, recrystallized from ethanol-isopropanol and dried in vacuo at 60° to yield the 1,3-bis-[N-(3-diethylamino-propyl)-4-piperidyl]-propane tetrahydrochloride monohydrate of the formula

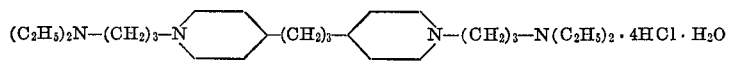

melting at 271–272° with decomposition.

Example 5

4.2 g. 1,3-bis-(4-piperidyl)-propane are added to 80 ml. of an 8% solution of 2-pyrrolidino-ethyl chloride in toluene and the mixture is refluxed and stirred overnight. It is then filtered, the filtrate evaporated in vacuo, the residue taken up in ethyl acetate and the solution acidified with a saturated solution of hydrogen chloride in ethyl acetate. The precipitate formed is filtered off, washed with diethyl ether and recrystallized from methanol to yield the 1,3-bis-[N-(2-pyrrolidino-ethyl)-4-piperidyl]-propane tetrahydrochloride of the formula

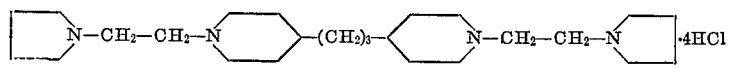

melting at 358–361°.

Example 6

6.3 g. 1,3-(4-piperidyl)-propane are added to 52 ml. of a 18.5% solution of 2-piperidino-ethyl chloride in toluene and the mixture is refluxed for 1½ hours while stirring. After cooling it is filtered, the filtrate evaporated in vacuo, the residue taken up in ethyl acetate and the solution acidified with a saturated solution of hydrogen chloride in ethyl acetate. The precipitate formed is filtered off and recrystallized from methanol-ethyl acetate and methanol-diethyl ether to yield the 1,3-bis-[N-(2-piperidino-ethyl)-4-piperidyl]-propane tetrahydrochloride of the formula

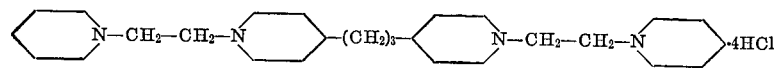

melting above 360°.

Example 7

The mixture of 42 g. 1,3-bis-(4-piperidyl)-propane, 12.1 g. 3-dimethylamino-propyl chloride and 250 ml. toluene is refluxed for 5 hours while stirring. After standing overnight at room temperature, it is filtered, the filtrate evaporated in vacuo, the residue taken up in ethyl acetate and the solution acidified with a saturated solution of hydrogen chloride in ethyl acetate. The precipitate formed is filtered off, three times recrystallized from 1 liter, 500 ml. and 700 ml. n-propanol respectively, then taken up in 175 ml. 95% aqueous ethanol, the solution filtered, concentrated to 80 ml. and allowed to stand over the weekend to yield the N - (3 - dimethylamino - propyl) - 1,3 - bis - (4-piperidyl)-propane trihydrochloride of the formula

melting at 277–279°.

5 g. thereof are dissolved in 25 ml. water, the solution made alkaline with 2 N aqueous sodium hydroxide and extracted with ethyl acetate. The extract is dried, filtered and evaporated in vacuo to yield the corresponding base as an oil.

Example 8

To the stirred solution of 7.3 g. N-(3-dimethylamino-propyl)-1,3-bis-(4-piperidyl)-propane in 50 ml. ethyl acetate, the solution of 1 g. sodium hydroxide in 4 ml. water is added, followed by the dropwise addition of 3.6 g. dichloroacetyl chloride in 50 ml. ethyl acetate during 2 hours at room temperature. The supernatant organic solution is decanted off and acidified with a saturated solution of hydrogen chloride in ethyl acetate. The mixture is extracted with water, the aqueous layer separated and made basic with 2 N-aqueous sodium hydroxide. It is extracted with ethyl acetate, the extract dried, filtered and evaporated to yield the N-(dichloro-acetyl)-N'-(3-dimethylamino-propyl)-1,3-bis-(4-piperidyl)-propane of the formula

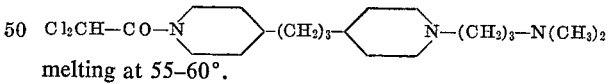

melting at 55–60°.

Example 9

To the solution of 3.6 g. N-(3-dimethylamino-propyl)-1,3-bis-(4-piperidyl)-propane in 25 ml. ethyl acetate, the solution of 0.5 g. sodium hydroxide in 2 ml. water is added, followed by the dropwise addition of 2.3 g. 4-nitrobenzoyl chloride in 25 ml. ethyl acetate and the mixture is stirred at room temperature for 2 hours. The supernatant solution is decanted off, acidified with a saturated solution of hydrogen chloride in ethyl acetate and the precipitate formed extracted with water. The aqueous layer is separated, made basic with 2 N aqueous sodium hydroxide and extracted with ethyl acetate. The extract is dried, filtered and evaporated to yield the N-(4-nitro-benzoyl)-N' - (3-dimethylamino-propyl)-1,3-bis-(4-piperidyl)-propane of the formula

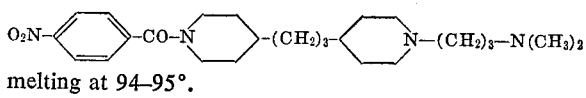

melting at 94–95°.

Example 10

In the manner analogous to that described in Examples 8 and 9, the following compounds are prepared from equivalent amounts of the corresponding starting material:

R—CO—⟨   ⟩—(CH₂)₃—⟨   ⟩—(CH₂)₃—N(CH₃)₃

| R | M.P., ° | Thin layer R$_{cm}$ |
|---|---|---|
| n-Propyl | | 5.0 A (9:1:1) |
| n-Heptyl | | 9.8 B (9:9:2) |
| Cyclopropyl | | 11.0 C (9:1) |
| Cyclobutyl | | 4.5 B (9:9:2) |
| Cyclopentyl | | 11.5 C (9:1) |
| Cyclohexyl | | 6.8 C (9:1) |
| Adamantyl | 68–71 | |
| ⟨H⟩—S—CH₂ | | 7.0 C (9:1) |
| C₆H₅—CH₂S—CH₂ | 61–63 | |
| C₆H₅—O—CH₂ | | 6.8 B (9:9:2) |
| C₆H₅—S—CH₂ | 57–59 | |
| 4-CH₃—C₆H₄—S—CH₂ | 68–72 | |
| 4-Cl—C₆H₄—S—CH₂ | 58–61 | |
| C₆H₅ | | 3.0 C (9:1) |
| β-Naphthyl | 77–80 | |
| 4-CH₃—C₆H₄ | | 6.5 B (9:9:2) |
| 4-CH₃O—C₆H₄ | 53–54 | |
| 3,4,5-tri-CH₃O—C₆H₂ | | 5.3 B (9:9:2) |
| 4-F—C₆H₄ | | 4.2 B (9:9:2) |
| 3-F—C₆H₄ | | 4.8 A (9:1:1) |
| 2-F—C₆H₄ | | 5.7 C (9:1) |
| 4-Cl—C₆H₄ | 63–66 | |
| 4-Br—C₆H₄ | 74–76 | |
| 3-SO₂NH₂—4—Cl—C₆H₃ | 184–186 | |
| 4-CF₃—C₆H₄ | 78–80 | |
| 4-CF₃—2—NO₂—C₆H₃ | 103–105 | |
| 4-CH₃CO—C₆H₄ | 51–54 | |
| 2-CH₃CO—C₆H₄ | | 4.0 B (9:9:2) |
| 3,5-di—NO₂—C₆H₃ | 98–100 | |
| 4-NH₂—C₆H₄ | 122–124 | |
| 4-CH₃CONH—C₆H₄ | 94–96 | |
| 4-NC—C₆H₄ | 93–95 | |
| C₆H₅—CH₂ | | 3.9 C (9:1) |
| C₆H₅—CHCl | 87 | |
| 4-CH₃—C₆H₄—CH₂ | | 5.5 A (9:1:1) |
| (C₆H₅)₂CH | 78–79 | |
| C₆H₅—(CH₂)₂ | | 7.5 B (9:9:2) |
| C₆H₅—(CH₂)₃ | | 7.1 B (9:9:2) |
| 4-pyridyl | 47–50 | |
| 5-NO₂—2—furyl | 71–72 | |
| 2-thienyl | 70–71 | |

NOTE:
A = Benzene plus 2-propanol plus diethylamine.
B = Carbon tetrachloride plus benzene plus diethylamine.
C = Benzene plus diethylamine.

Example 11

The mixture of 9.0 g. 1,3-bis-[N-(2-chloro-ethyl)-4-piperidyl]-propane, 75 ml. ethanol and 17.2 g. benzylamine is refluxed for 5 hours while stirring and allowed to stand at room temperature for 4 days. The precipitate formed is filtered off, washed with ethanol and the filtrate evaporated in vacuo. To the residue 2 N aqueous sodium hydroxide is added and the whole extracted with ethyl acetate. The extract is washed with water, dried and evaporated. The residue is dissolved in the minimum amount of methanol and the solution acidified with hydrogen chloride in ethyl acetate. The precipitate formed is filtered off, washed with cold methanol and dried in vacuo, to yield the 1,3 - bis - [-(2-benzylamino-ethyl)-4-piperidyl]-propane tetrahydrochloride of the formula

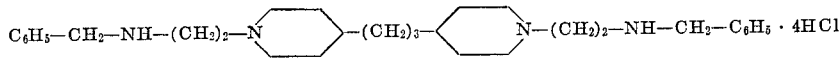

melting at 274–276° with decomposition.

The starting material is prepared as follows: To the solution of 20.0 g. 1,3-bis-[N-(2-hydroxy-ethyl)-4-piperidyl]-propane in 100 ml. chloroform, the solution of 11.7 ml. thionyl chloride in 20 ml. chloroform is added dropwise while stirring. The mixture is refluxed for 2 hours, diluted with 100 ml. chloroform and again refluxed for 2 hours. It is then cooled in an ice bath, filtered and the residue washed with chloroform. It is dissolved in water, the aqueous layer separated from chloroform and washed with chloroform. It is then combined with the solution of 25.0 g. potassium carbonate in 100 ml. water and the mixture extracted with diethyl ether. The extract is dried, filtered and the filtrate evaporated, to yield the 1,3-bis-[N-(2-chloro-ethyl)-4-piperidyl]-propane.

Example 12

The mixture of 0.5 g. N-methyl-N'-(2-chloro-ethyl)-1,3-bis-(4-piperidyl)-propane, 1 ml. diethylamine and 50 ml. n-butanol is kept in a sealed bottle at the steam cone overnight. It is then filtered, the filtrate evaporated in vacuo, the residue taken up in ethyl acetate and the solution acidified with a saturated solution of hydrogen chloride in ethyl acetate. The precipitate formed is filtered off and recrystallized from 95% ethanol to yield the N-methyl - N' - (2-dimethylamino-ethyl)-1,4-bis-(4-piperidyl)-propane trihydrochloride of the formula

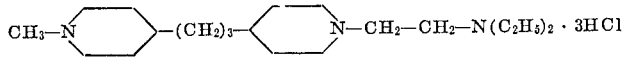

showing in the I.R.-spectrum inter alia bands between 1400 and 1440 cm.⁻¹.

The starting material is prepared as follows: To the mixture of 21 g. 1,3-bis-(4-piperidyl)-propane and 50 ml. chloroform, the solution of 14.74 g. chloral in 25 ml. chloroform is added dropwise while stirring. The mixture is further stirred at room temperature for 18 hours and finally heated at the steam cone for 30 minutes. It is concentrated in vacuo, the mixture filtered, the filtrate distilled and the fraction boiling at 115–120°/0.04 mm. Hg collected; it represents the N-formyl-1,3-bis-(4-piperidyl)-propane.

The solution of 8.8 g. thereof in 50 ml. tetrahydrofuran is added dropwise to the mixture of 2.0 g. lithium aluminum hydride in 75 ml. tetrahydrofuran while stirring. The mixture is refluxed for 18 hours, cooled and decomposed by the addition of 2 ml. water, 1.5 ml. 20% aqueous sodium hydroxide and 6 ml. water. It is filtered, the filtrate evaporated in vacuo, the residue distilled and the fraction boiling at 115–120°/0.05 mm. Hg collected; it represents the N-methyl-1,3-bis-(4-piperidyl)-propane.

The mixture of 5 g. thereof, 2.97 g. 2-bromo-ethanol, 5.0 g. sodium carbonate and 125 ml. benzene is refluxed for 17 hours while stirring. It is cooled, filtered, the filtrate evaporated in vacuo, the residue distilled and the fraction boiling at 150–160°/0.15 mm. Hg collected; it represents the N-methyl-N'-(2-hydroxy-ethyl) - 1,3 - bis-(4-piperidyl)-propane.

The solution of 2.68 g. thereof in 50 ml. benzene is added dropwise to the stirred solution of 1.5 g. thionyl chloride in 100 ml. benzene. Hereupon the mixture is refluxed for 5 hours and stirred overnight at room temperature. The mixture is evaporated in vacuo, the residue taken up in water, the solution made basic with 2 N aqueous sodium hydroxide and extracted with ethyl acetate. The extract is dried, filtered and evaporated to yield the N-methyl-N'-(2-chloro-ethyl) - 1,3 - bis-(4-piperidyl)-propane.

Example 13

The mixture of 13.6 g. 1,2 - bis(2 - piperidyl) - ethane, 26.6 g. 3-dimethylamino-propyl chloride and 220 ml. toluene is refluxed for 18 hours while stirring and cooled to room temperature. It is filtered, the filtrate evaporated in vacuo, the residue taken up in ethyl acetate and the solution filtered. The filtrate is acidified with hydrogen chloride in ethyl acetate and the precipitate formed filtered off. It is dissolved in water, the solution washed with ethyl acetate, made basic with aqueous sodium hydroxide and extracted with ethyl acetate. The extract is washed with water, dried and evaporated in vacuo. The residue is dissolved in ethyl acetate, the solution acidified with hydrogen chloride in ethyl acetate, the precipitate formed filtered off and recrystallized from isopropanol-ethyl acetate to yield the 1,2-bis-[N-(3-dimethylamino-propyl)-2-piperidyl]-ethane tetrahydrochloride of the formula

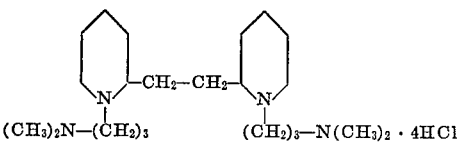

melting at 232–235°.

The starting material is prepared as follows: The mixture of 20 g. 1,2-bis-(2-pyridyl)-ethene, 8 g. 10% palladium-charcoal and 200 ml. glacial acetic acid is hydrogenated first at room temperature and then at 60–65° and 52 p.s.i. until the theoretical amount of hydrogen is absorbed. It is then filtered, the filtrate evaporated in vacuo, the residue made basic with 2 N aqueous sodium hydroxide, the mixture extracted with diethyl ether and the extract dried and evaporated. The residue is distilled and the fraction boiling at 82–88°/0.4 mm. Hg collected; it represents the 1,2-bis-(2-piperidyl)-ethane.

Example 14

To the solution of 1.8 g. N-(4-nitro-benzoyl)-1,3-bis-(4-piperidyl)-propane in 10 ml. toluene, the solution of 1.2 g. 3-dimethylamino-propyl chloride in 10 ml. acetone is added dropwise and the mixture stirred and refluxed for 16 hours. After cooling the precipitate formed is filtered off, the filtrate evaporated in vacuo, the residue taken up in ethyl acetate, the solution acidified with hydrogen chloride in ethyl acetate and the precipitate formed filtered off. It is dissolved in water, the solution extracted with ethyl acetate, the aqueous layer made basic with 2 N aqueous sodium hydroxide and extracted with ethyl acetate. The extract is washed with water, dried and evaporated in vacuo to yield the N-(4-nitro-benzoyl)-N'-(3-dimethylaminopropyl)-1,3-bis-(4-piperidyl) - propane melting at 94–95°; it is identical with the compound obtained according to Example 9.

The starting material is prepared as follows: To the solution of 12.6 g. 1,3-bis-(4-piperidyl)-propane in 100 ml. ethyl acetate, the solution of 5.6 g. 4-nitro-benzoyl chloride in 80 ml. ethyl acetate is added dropwise while stirring at room temperature and the mixture is allowed to stand overnight. It is filtered, the filtrate evaporated in vacuo, the residue triturated with hexane, the remaining solids dissolved in diluted hydrochloric acid, the aqueous solution made basic with 2 N aqueous sodium hydroxide, the precipitate formed filtered off and recrystallized from aqueous ethanol to yield the N-(4-nitro-benzoyl)-1,3-bis-(4-piperidyl)-propane melting at 110–112°.

Example 15

To the stirred solution of 3.6 g. N-(3-dimethylaminopropyl)-1,3-bis-(4-piperidyl)-propane in 25 ml. ethyl acetate, the solution of 0.5 g. sodium hydroxide in 2 ml. water is added, followed by the solution of 3.4 g. 2,4,5-trichloro-benzenesulfonyl chloride in 25 ml. ethyl acetate, which is added during 5 minutes. The temperature rises to about 34° and a precipitate forms. The mixture is allowed to stir at room temperature for about 2 hours, the supernatant solution decanted off and strongly acidified with a saturated solution of hydrogen chloride in ethyl acetate. The precipitate formed is dissolved in water and the solution made alkaline with 2 N aqueous sodium hydroxide. The mixture is extracted with diethyl ether, the extract dried, filtered and evaporated, to yield the N - (2,4,5-trichloro-benzenesulfonyl)-N'-(3-dimethylamino-propyl)-1,3 - bis - (4 - piperidyl)-propane of the formula

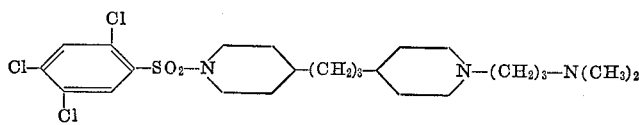

melting at 57–60°.

Example 16

In a manner analogous to that described in Example 15, the following compounds are prepared from equivalent amounts of the corresponding starting material:

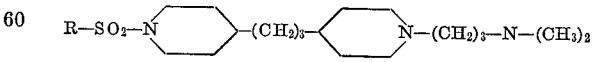

| R | M.P., ° | Thin layer R$_{cm}$. |
|---|---|---|
| 4-F—C$_6$H$_4$ | 69–71 | |
| 4-Cl-3-NO$_2$—C$_6$H$_3$ | | 7.5 D (9:1) |
| 4-NH$_2$—C$_6$H$_4$ | 143–146 | |
| 4-CH$_3$CONH—C$_6$H$_4$ | 135 | |

Note.—D=Chloroform plus diethylamine.

Example 17

To the stirred solution of 3.6 g. N-(3-dimethylaminopropyl)-1,3-bis-(4-piperidyl)-propane in 25 ml. ethyl acetate, the solution of 1.7 g. of 4-fluorophenyl-isocyanate in 25 ml. ethyl acetate is added dropwise during a 5-minute period. The temperature rises to about 30° and the reaction mixture is stirred at room temperature for about two hours. It is filtered, the filtrate acidified with saturated hydrogen chloride in ethyl acetate, the precipitate formed filtered off and dissolved in water. The solution obtained is made strongly alkaline with 2 N aqueous sodium hydroxide and extracted with diethyl ether. The extract is dried, filtered and evaporated to yield the N-(4-fluorophenylcarbamoyl) - N' - (3-dimethylamino-propyl)-1,3-bis-(4-piperidyl)-propane of the formula

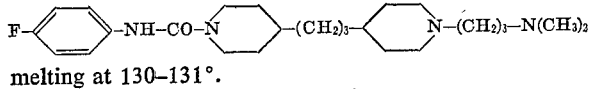

melting at 130–131°.

Example 18

In a manner analogous to that described in Example 17, the following compounds are prepared from equivalent amounts of the corresponding starting material:

R—NH—CO—N⟩—(CH₂)₃—⟨N—(CH₂)₃—N(CH₃)₂

| R | M.P., ° | Thin layer $R_{cm}$ |
|---|---|---|
| $C_2H_5$ | 82–84 | |
| n-$C_4H_9$ | 58–61 | |
| $C_2H_5OCO—CH_2$ | | 9.0 C (9:1) |
| Cyclohexyl | 106–107 | |
| $C_6H_5$ | 96–98 | |
| 4-$CH_3$—$C_6H_4$ | 106–107 | |
| 4-$CH_3O$—$C_6H_4$ | 80–85 | |
| 4-Cl—$C_6H_4$ | 110–113 | |
| 4-$O_2N$—$C_6H_4$ | 88–89 | |

EXAMPLE 19

To the stirred solution of 3.6 g. N-(3-dimethylamino-propyl)-1,3-bis-(4-piperidyl)-propane in 25 ml. of ethyl acetate, the solution of 1.9 g. 4-fluoro-phenyl-isothiocyanate in 25 ml. of ethyl acetate is added and the mixture allowed to stir at room temperature for about 2 hours. The supernatant solution is decanted off, strongly acidified with a saturated solution of hydrogen chloride in ethyl acetate, and the precipitate formed filtered off. It is dissolved in water, the solution made alkaline with 2 N aqueous sodium hydroxide and extracted with diethyl ether. The extract is dried, filtered and evaporated to yield the N - (4 - fluorophenylthiocarbamoyl) - N' - (3 - dimethylamino - propyl) - 1,3-bis-(4-piperidyl) - propane of the formula

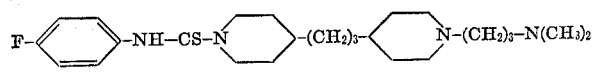

melting at 113–115°.

EXAMPLE 20

The mixture of 4.4 g. N-(3-dimethylamino-propyl)-1,3-bis-(4-piperidyl)-propane, 2.1 g. 4-fluoro-acetophenone, 2.1 g. anhydrous potassium carbonate and 15 ml. dimethylsulfoxide is heated to 90–95° C. for 22 hours. It is then cooled to room temperature, diluted with 75 ml. water and extracted with diethyl ether. The extract is dried, filtered and the filtrate made acidic with a saturated hydrogen chloride-ethyl acetate solution. The precipitate formed is filtered off, dissolved in water and the solution washed with diethyl ether. The aqueous solution is made strongly alkaline with 2 N aqueous sodium hydroxide, extracted with diethyl ether, the extract dried and evaporated to yield the N-(4-acetylphenyl)-N'-(3-dimethylamino - propyl)-1,3-bis-(4-piperidyl)-propane of the formula

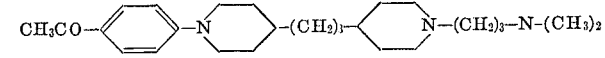

having a thin layer $R_{cm}$ of 9.0 (benzene+methanol+diethylamine 9:1:1).

EXAMPLE 21

To the solution of 6.0 g. N-(3-dimethylamino-propyl)-1,3-bis-(4-piperidyl)-propane in 30 ml. methanol, 7 ml. methyl iodide are added while cooling the mixture in an ice bath. It is then allowed to stand at room temperature for about 30 minutes, whereupon 5 more ml. of methyl iodide are added. The reaction mixture is allowed to stand at room temperature overnight and evaporated in vacuo. The residue is triturated with ethyl acetate and then with acetone and recrystallized from ethanol to yield the N-(3-dimethylamino-propyl)-1,3-bis-(4-piperidyl)-propane hydroiodide dimethoiodide of the formula

melitng at 168° C.

EXAMPLE 22

To the solution of 5.4 g. 1,3-bis-[N-(3-dimethylamino-propyl)-4-piperidyl]-propane in 30 ml. methanol, 10 ml. methyl iodide are added. The reaction mixture becomes slightly warm and is allowed to stand at room temperature for about 30 minutes, whereupon 5 ml. more of methyl iodide are added. The mixture is allowed to stand at room temperature until a viscous oil separates. The supernatant layer is decanted off and after the addition of ethanol, the product crystallizes. It is filtered off and recrystallized two times from about 150 ml. ethanol to yield the 1,3 - bis-[N-(3-dimethylamino-propyl)-4-piperidyl]-propane tetramethoiodide of the formula

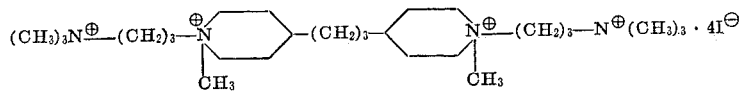

melting at 257° with decomposition.

EXAMPLE 23

The mixture of 4.4 g. N-(3-dimethylamino-propyl)-1,3-bis-(4-piperidyl)-propane, 2.4 g. 4-chloro-benzyl chloride, 1.6 g. anhydrous sodium carbonate and 100 ml. toluene is refluxed for 22 hours. It is allowed to cool to room temperature, filtered and the filtrate evaporated in vacuo. The residue is dissolved in ethyl acetate, the solution filtered, the filtrate made strongly acidic with saturated hydrogen-chloride-ethyl acetate and the precipitate formed filtered off. It is dissolved in water, the solution made alkaline with 2 N aqueous sodium hydroxide and extracted with ethyl acetate. The extract is dried, filtered, and evaporated to yield the N-(4-chloro-benzyl)-N'-(3-dimethylamino-propyl)-1,3-bis - (4 - piperidyl) - propane of the formula

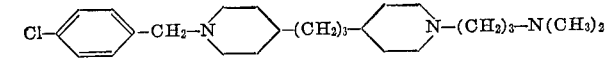

having a thin layer $R_{cm}$ of 8.0 (carbon tetrachloride+benzene+dimethylamine 9:9:2).

EXAMPLE 24

The mixture of 4.4 g. N-(3-dimethylamino-propyl)-1,3-bis-4-piperidyl)-propane, 2.7 g. cyclohexylmethyl-bromide, 1.6 g. anhydrous sodium carbonate and 100 ml. toluene is stirred and refluxed for 24 hours. It is then cooled to room temperature, filtered, the filtrate evaporated in vacuo and the residue dissolved in ethyl acetate. The solution is acidified with hydrogen chloride-ethyl acetate mixture and the precipitate formed filtered off. It is dissolved in water, the solution made alkaline with 2 N aqueous sodium hydroxide, and the mixture extracted with diethyl ether. The extract is dried, filtered, evaporated and the residue taken up in diethyl acetate. The solution is acidified with hydrogen chloride in ethyl acetate, the precipitate formed filtered off and recrystallized from ethanol to yield the N-cyclohexylmethyl-N'-(3-dimethylamino-propyl)-1,3 - bis-(4-piperidyl)-propane trihydrochloride of the formula perature, the organic layer is separated. It is made strongly acidic with a saturated solution of hydrogen chloride in ethyl acetate and the precipitate formed is dissolved in water. The solution is made basic with 2 N aqueous sodium hydroxide, the precipitate formed taken up in diethyl ether, the ethereal solution dried, filtered and evaporated in vacuo. The residue is dissolved in 200 ml. isopropanol and the solution made strongly acidic with a solution of hydrogen chloride in ethyl acetate. The precipitate formed is filtered off, washed with ethyl acetate, dried and recrystallized from 400 ml. ethanol, to yield the N-2-furoyl - N' - (3 - dimethylamino-propyl)-1,3-bis-(4-piperidyl)-propane dihydrochloride of the formula

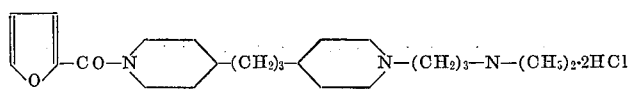

melting at 247–248°.

2.0 g. of the corresponding base in 10 ml. isopropanol may also be salified with 0.58 g. maleic acid in 5 ml. isopropanol, to yield the N-2-furoyl-N'-(3 - dimethylamino-propyl) - 1,3 - bis - (4-piperidyl)-propane maleate melting at 147–148°.

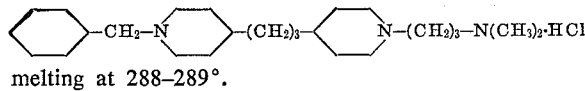

melting at 288–289°.

EXAMPLE 25

The mixture of 4.4 g. N-(3-dimethylamino-propyl)-1,3-bis-(4-piperidyl)-propane, 2.8 g. 3-chloro-propyl 2-thienyl ketone, 2.6 g. anhydrous sodium carbonate and 100 ml. toluene is stirred and refluxed for 24 hours and then cooled to room temperature. It is filtered, the filtrate evaporated in vacuo and the residue dissolved in ethyl acetate. The solution is acidified with a hydrogen chloride-ethyl acetate mixture, the precipitate formed filtered off and recrystallized from ethanol to yield the N-[3-(2-thienoyl)-propyl]-N'-(3-dimethylamino-propyl) - 1,3 - bis - (4 - piperidyl)-propane trihydrochloride of the formula

Example 28

The mixture of 15.0 g. 1,3-bis - [N - (2-amino-ethyl)-4-piperidyl]-propane, 100 ml. ethanol and 12.7 g. benzylchloride is refluxed for 3 hours while stirring. After cooling, the precipitate formed is filtered off, dissolved in the minimum amount of methanol and the solution acidified with hydrogen chloride in ethyl acetate. The precipitate formed is filtered off and recrystallized from methanol to yield the 1,3 - bis - [N-(2-benzylamino-ethyl) - 4-piperidyl]-propane tetrahydrochloride melting at 272–

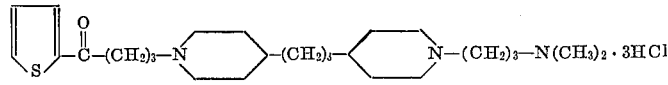

melting at 252–253° C.

In the analogous manner the N-(3-benzoyl-propyl)-N'-(3-dimethylamino-propyl - 1,3 - bis - (4 - piperidyl) - propane trihydrochloride is prepared; M.P. 259–261°.

Example 26

The mixture of 366.5 g. 1,3-bis-(4-piperidyl)-propane, 143.0 g. 3-dimethylamino-propyl chloride and 1250 ml. toluene is refluxed for 3 hours while stirring. After cooling it is filtered, the residue discarded and the filtrate is evaporated in vacuo. The residue is dissolved in 1,500 ml. n-propanol and anhydrous hydrogen chloride is introduced until the solution is strongly acidic. It is cooled to 20° filtered, and the residue dissolved in approximately 1000 ml. water. To the solution 150.0 g. sodium hydroxide in 300 ml. water are added and the mixture extracted with ethyl acetate. The extract is washed with water, dried and evaporated in vacuo. The residue is distilled and the main fraction boling at 177–190°/0.45 mm. Hg collected; it represents the N-(3-dimethylamino-propyl)-1,3-bis-(4-piperidyl)-propane, which is identical with the product obtained according to Example 7.

Example 27

To the solution of 57.6 g. N-(3-dimethylamino-propyl)-1,3 - bis-(4 - piperidyl)-propane in 250 ml. ethyl acetate, the solution of 8.0 g. sodium hydroxide in 32 ml. water is added, followed by the solution of 26.1 g. 2-furoyl chloride in 250 ml. ethyl-acetate, which is added during 10 minutes while stirring. The temperature is kept below 37° C. and after stirring for 2 hours at room tem- 275° with decomposition; it is identical with the product obtained according to Example 11.

The starting material is prepared as follows: To the mixture of 40 g. 1,3-bis-(4-piperidyl)-propane, 24 g. sodium carbonate, 400 ml. n-butanol and 3 drops water, the solution of 37 g. chloracetonitrile in 50 ml. n-butanol is added dropwise while stirring. The mixture is stirred and refluxed for 45 hours, filtered hot, the residue washed with butanol and the filtrate evaporated in vacuo. The residue is triturated with warm water, the mixture made alkaline to pH 11 with 40% aqueous sodium hydroxide and extracted with methylene chloride. The extract is washed with water, dried, filtered and evaporated. The residue is triturated with diethyl ether and recrystallized from ethanol to yield the 1,3-bis-(N - cyanomethyl - 4-piperidyl)-propane melting at 87–88°.

The solution of 16.88 thereof in 100 ml. tetrahydrofuran is added dropwise to the stirred mixture of 3.33 g. lithium aluminum hydride and 200 ml. tetrahydrofuran and the mixture is stirred and refluxed for 42 hours. During this time some tetrahydrofuran is added to facilitate stirring. Hereupon 3.33 ml. water, 2.5 ml. 20% sodium hydroxide and 11.7 ml. water are added in this order and the mixture filtered. The filtrate is evaporated in vacuo, the residue distilled and the fraction boiling at 150–170°/0.15 mm. Hg collected; it represents the 1,3 - bis - [N-(2 - amino-ethyl-4-piperidyl]-propane.

In the analogous manner the 1,3-bis-[N-(3 - amino-propyl)-4 - piperidyl]-propane is prepared, B.P. 162–170°/0.38 mm. Hg.

The starting material may also be prepared thus: To the mixture of 10.5 g. 1,3-bis-(4-piperidyl)-propane, 100 ml. toluene and 0.05 g. methanesulfonic acid, the solution of 3.23 g. ethyleneimine in 5 ml. toluene is added and the mixture stirred for 18 hours at 60°. It is evaporated in vacuo, the residue dissolved in ethyl acetate, the solution acidified with a saturated solution of hydrogen chloride in ethyl acetate and the precipitate formed filtered off. It is dissolved in water, the solution made alkaline with aqueous sodium hydroxide, extracted with diethyl ether, the extract dried, filtered and evaporated. The residue is distilled and the fraction boiling at 150–170°/0.15 mm. Hg collected; it represents the 1,3-bis-[N-(2-aminoethyl)-4-piperidyl]-propane.

Example 29

To the mixture of 3.04 g. lithium aluminum hydride and 300 ml. diethyl ether, 8.2 g. 1,3-bis-[N-(β-dimethyl-amino-propionyl)-4 - piperidyl]-propane are added portionwise while stirring and the stirring is continued for 18 hours at room temperature. Hereupon, 9 ml. ethyl acetate, 3 ml. water, 6 ml. 15% aqueous sodium hydroxide and 9 ml. water are added in this order and the mixture filtered. The filtrate is strongly acidified with a saturated solution of hydrogen chloride in ethyl acetate, the precipitate formed filtered off and recrystallized from ethanol, to yield the 1,3-bis-[N - (3 - dimethylamino-propyl)-4-piperidyl]-propane tetrahydrochloride melting at 322–323°; it is identical with the product obtained according to Example 3.

The starting material is prepared as follows: To the solution of 21.0 g. 1,3-bis-(4-piperidyl)-propane in 150 ml. ethyl acetate, the solution of 12.7 g. β-chloro-propionyl chloride in 60 ml. ethyl acetate is added during 10 minutes while stirring and the mixture is stirred for 90 minutes at room temperature. It is filtered and the filtrate evaporated in vacuo to yield the 1,3-bis - [N - (β-chloropropionyl)-4-piperidyl]-propane.

To the solution of 9.8 g. thereof in 100 ml. ethanol, the solution of 10 ml. dimethylamine in 50 ml. ethanol is added at 5° while stirring. The mixture is stirred overnight at room temperature, finally refluxed for 2 hours and evaporated in vacuo. The residue is triturated with ethyl acetate and recrystallized from ethanol-ethyl acetate to yield the 1,3-bis - [N - (β - dimethylaminopropionyl)-4-piperidyl]-propane dihydrochloride melting at 230–232° with decomposition.

10.0 g. thereof are dissolved in the minimum amount of water, the solution made basic with aqueous sodium hydroxide, extracted with diethyl ether, the extract dried, filtered and evaporated to yield the corresponding free base.

Example 30

The mixture of 5.9 g. N-(3-dimethylamino-propyl)-1,3-bis-(4-piperidyl)-propane, 5.4 g. N-(3-bromo-propyl)-phthalimide, 2.1 g. sodium carbonate and 125 ml. toluene is refluxed for 21 hours while stirring. It is cooled, filtered, the filtrate evaporated in vacuo and the residue taken up in ethyl acetate. The solution is filtered, the filtrate made strongly acidic with hydrogen chloride in ethyl acetate and the precipitate formed filtered off. It is dissolved in water, the solution made alkaline with 2 N aqueous sodium hydroxide and extracted with diethyl ether. The extract is dried, filtered and evaporated, to yield the N-(3-phthaloylamino - propyl)-N′-(3-dimethylamino - propyl)-1,3-bis-(4-piperidyl)-propane of the formula

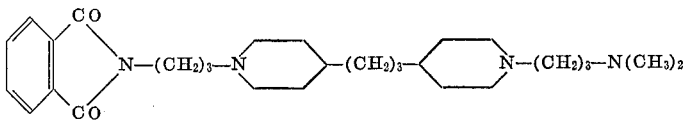

showing in the thin layer chromatogram an $R_{cm}=12.0$ (benzene×diethylamine 9:1).

Example 31

To the stirred mixture of 4.4 g. N-(3-dimethylamino-propyl)-1,3-bis-(4-piperidyl)-propane, 1.6 g. sodium carbonate and 100 ml. toluene, 3.1 g. 2-bromo-5-nitro-thiazole are added portionwise, the mixture heated to 105° for 5 hours and allowed to stand overnight at room temperature. It is then filtered, the filtrate made strongly acidic with hydrogen chloride in ethyl acetate and the precipitate formed filtered off. The residue is dissolved in water, the solution washed with ethyl acetate, the aqueous layer separated and made basic with aqueous sodium hydroxide. The mixture is extracted with diethyl ether, the extract dried, filtered and evaporated, to yield the N-(5-nitro-2-thiazolyl)-N-(3-dimethylamino-propyl)-1,3-bis-(4-piperidyl)-propane of the formula

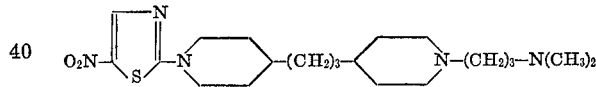

showing in the thin layer chromatogram an $R_{cm}=10.5$ (benzene+diethylamine 9:1).

Example 32

The mixture of 6.3 g. 1,3-bis-(4-piperidyl)-propane, 19.7 g. N-methyl-N-(3-chloro-propyl)-benzylamine and 200 ml. toluene is refluxed for 22 hours and cooled to room temperature. It is filtered, the filtrate evaporated in vacuo and the residue taken up in ethyl acetate. The solution is filtered, the filtrate made strongly acidic with hydrogen chloride in ethyl acetate and the precipitate formed filtered off. It is dissolved in water, the solution made basic with aqueous sodium hydroxide, extracted with diethyl ether, the extract dried, filtered and evaporated. The residue is taken up in methanol+diethylamine 9:1 and the solution subjected to preparative thin layer chromatography. The product having an $R_{cm}=9.0$ is dissolved in ethyl acetate, the solution made strongly acidic with hydrogen chloride in ethyl acetate and the precipitate formed filtered off, to yield the N-[3-(N-methyl-N-benzylamino)-propyl]-1,3-bis-(4-piperidyl)-propane trihydrochloride of the formula

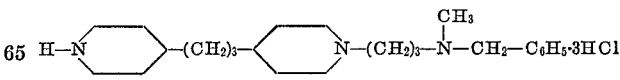

melting at 238°.

The product having an $R_{cm}=13.0$ is analogously converted into its salt, to yield the 1,3-bis-{N-[3-(N-methyl-N-benzylamino)-propyl]-4-piperidyl}-propane tetrahydrochloride of the formula

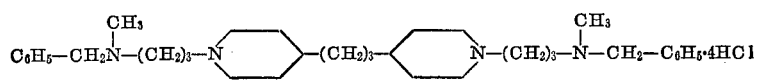

melting at 290° with decomposition.

Example 33

The mixture of 8.8 g. 1,3-bis-[N-(3-chloro-propyl)-4-piperidyl]-propane dihydrochloride, 14.5 g. N-methyl-benzylamine and 75 ml. ethanol is refluxed for 4 hours and evaporated in vacuo. The residue is taken up in water, the solution made basic with 6 N aqueous sodium hydroxide and extracted with ethyl acetate. The extract is dried, filtered, and the filtrate acidified with hydrogen chloride in ethyl acetate. The precipitate formed is filtered off and recrystallized from methanol, to yield the 1,3-bis-{N-[3-(N-methyl-N-benzylamino) - propyl]-4-piperidyl} - propane tetrahydrochloride melting at 290° with decomposition; it is identical with the product obtained according to Example 32.

The starting material is prepared as follows: The mixture of 42.0 g. 1,3-bis-(4-piperidyl)-propane, 63.0 g. 3-bromopropyl chloride and 400 ml. benzene is stirred for 6 hours at room temperature and allowed to stand overnight in the refrigerator. It is then filtered, the residue washed with ethyl acetate and the filtrate acidified with a saturated solution of hydrogen chloride in ethyl acetate. The precipitate formed is filtered off, washed with isopropanol-diethyl ether and recrystallized from 200 ml. isopropanol, to yield the 1,3-bis-[N-(3-chloro-propyl)-4-piperidyl]-propane dihydrochloride melting at 230–233°.

Example 34

The mixture of 5.8 g. 1,2-bis-(4-piperidyl)-ethane, 10.9 g. 3-diethylamino-propyl chloride and 200 ml. toluene is refluxed for 18 hours while stirring. After cooling, it is filtered, the filtrate evaporated in vacuo, the residue taken up in ethyl acetate, and the mixture filtered. The filtrate is acidified with hydrogen chloride in ethyl acetate, the precipitate formed filtered off and dissolved in 60 ml. water. The solution is made basic with 2 N aqueous sodium hydroxide and extracted with diethyl ether. The extract is dried, filtered and evaporated. The residue is taken up in ethyl acetate, the solution acidified with hydrogen chloride in ethyl acetate and the precipitate formed filtered off, to yield the 1,2-bis-[N-(3-dimethyl-amino-propyl)-4-piperidyl]-ethane tetrahydrochloride of the formula

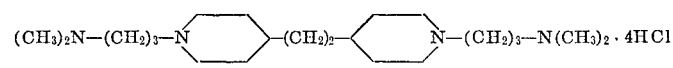

melting at 308° with decomposition.

The starting material is prepared as follows: The solution of 15.0 g. 1,2-bis-(4-pyridyl)-ethane in 175 ml. glacial acetic acid is hydrogenated over 6.0 g. 10% palladium on charcoal at 45 p.s.i. and 60° until the theoretical amount of hydrogen has been absorbed. The mixture is then filtered, the filtrate evaporated in vacuo and to the residue, the solution of 20.0 g. sodium hydroxide in 20 ml. water is added. The whole is extracted first with benzene and then with diethyl ether. The ethereal extract is dried, filtered, evaporated and the residue recrystallized from hexane, to yield the 1,2-bis-(4-piperidyl)-ethane melting at 110–113°.

EXAMPLE 35

The mixture of 5.6 g. 1,5-bis-(4-piperidyl)-pentane, 9.1 g. 3-dimethylamino-propyl chloride and 700 ml. toluene is refluxed for 24 hours while stirring. After cooling it is filtered, the residue washed with ethyl acetate and the filtrate evaporated in vacuo. The residue is taken up in ethyl acetate, the solution made strongly acidic with hydrogen chloride in ethyl acetate and the precipitate formed filtered off. It is dissolved in water, the solution made basic with 2 N aqueous sodium hydroxide and extracted with diethyl ether. The extract is dried, filtered and evaporated, the residue taken up in ethyl acetate and the solution acidified with hydrogen chloride in ethyl acetate. The precipitate formed is filtered off and recrystallized from ethanol to yield the 1,5-bis-[N-(3-dimethyl-amino-propyl)-4-piperidyl]-pentane tetrahydrochloride of the formula

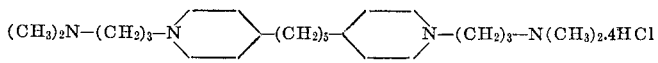

melting at 293° with decomposition.

The starting material is prepared as follows: To the suspension of 6.0 g. lithium pieces in 350 ml. diethyl ether, the solution of 79.0 g. bromobenzene in 100 ml. diethyl ether is added dropwise while stirring. After the lithium has disappeared, the mixture is added dropwise to the solution of 46.0 g. 4-picoline in 100 ml. diethyl ether at room temperature while stirring. After standing for 1 hour, the solution of 50.5 g. 1,3-dibromo-propane in 50 ml. diethyl ether is added dropwise while stirring and stirring is continued for 1 hour. The reaction mixture is then acidified with diluted hydrochloric acid and the aqueous layer separated. It is made basic with aqueous sodium hydroxide and extracted with diethyl ether. The extract is washed with water, dried, filtered and evaporated. The residue is distilled and the fraction boiling at 140–160°/0.2 mm. Hg collected; it represents the 1,5-bis-(4-pyridyl)-pentane.

The solution of 7.0 g. thereof in 70 ml. glacial acetic acid is hydrogenated over 4.0 g. 10% palladium on charcoal at 60° and 45 p.s.i. After the uptake of the theoretical amount of hydrogen, the mixture is filtered and the filtrate evaporated in vacuo. To the residue 30% aqueous sodium hydroxide is added and the mixture extracted with diethyl ether-ethyl acetate. The extract is dried, filtered, evaporated and the residue triturated with hexane, to yield the 1,5-bis-(4-piperidyl)-pentane melting at 74–76°.

EXAMPLE 36

The mixture of 21.0 g. 1,3-bis-(4-piperidyl)-propane, 36.5 g. 2-dimethylamino-propyl chloride and 900 ml. toluene is refluxed for 18 hours while stirring. After cooling to room temperature it is filtered and the residue washed with toluene. The filtrate is evaporated in vacuo, the residue taken up in ethyl acetate, the solution filtered and the filtrate made acidic with hydrogen chloride in ethyl acetate. The precipitate formed is filtered off, washed with diethyl ether and dissolved in water. The solution is made basic with aqueous sodium hydroxide, extracted with diethyl ether, the extract dried, filtered and evaporated. The residue is taken up in benzene+methanol+diethylamine 9:1:1 and subjected to preparative thin layer chromatography. The fraction having an $R_{cm}=6.0$ represents the N - (2 - dimethylamino-propyl)-1,3-bis-(4-piperidyl)-propane of the formula

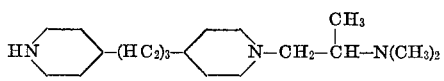

melting at 65–70°.

The fraction having an $R_{cm}=10.0$ is taken up in ethyl acetate, the solution acidified with hydrogen chloride in ethyl acetate and the precipitate formed filtered off, to yield the 1,3 - bis[N-(2-dimethylamino-propyl)-4-piperidyl]-propane tetrahydrochloride of the formula

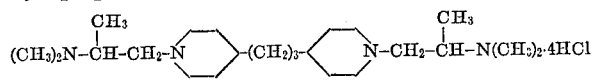

melting at 130°.

EXAMPLE 37

3.3 g. 1,3 - bis - [N-(3-amino-propyl)-4-piperidyl]-propane are added portionwise to 7.0 g. 90% formic acid while cooling and stirring. Hereupon 3.76 g. 35% formaldehyde are added dropwise and the mixture refluxed for 10 hours. Hereupon 4 ml. concentrated hydrochloric acid are added and the mixture evaporated in vacuo. The residue is dissolved in the minimum amount of water, the solution made alkaline with 6 N aqueous sodium hydroxide and extracted with ethyl acetate. The extract is washed with water, dried, filtered and evaporated. The residue is taken up in ethyl acetate, the solution acidified with hydrogen chloride in ethyl acetate, the precipitate formed filtered off and recrystallized from methanol to yield the 1,3 - bis-[N-(3-dimethylamino-propyl)-4-piperidyl]-propane tetrahydrochloride melting at 322–323°; it is identical with the product obtained according to Example 3.

EXAMPLE 38

Preparation of 10,000 tablets each containing 50.0 mg. of the active ingredient:

Formula:    G.
  N - 2-furoyl-N'-(3-dimethylamino-propyl)-
    1,3 - bis - (4-piperidyl)-propane dihydro-
    chloride _____ 500.00
  Lactose _____ 1,706.00
  Corn starch _____ 90.00
  Polyethylene glycol 6,000 _____ 90.00
  Talcum powder _____ 90.00
  Magnesium stearate _____ 24.00
  Purified water, q.s.

Procedure.—All the powders are passed through a screen with an opening of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

In the analogous manner tablets can be prepared of the compounds shown in the previous examples, especially of the N-phenylmercaptoacetyl-, N-phenylcarbamoyl- and N-(4-fluorophenyl)-carbamoyl-N'-(3-dimethylaminopropyl)-1,3-bis-(4-piperidyl)-propanes. These tablets may be applied 1 to 3 times a day.

Example 39

Preparation of 1000 tablets each containing 500 mg. of the active ingredient:

Formula:    G.
  N - (4-fluoro-phenylcarbamoyl)-N'-3-dimeth-
    ylamino - propyl - 1,3-bis-(4-piperidyl)-pro-
    pane _____ 500.0
  Wheat starch_____ 96.8

Formula:    G.
  Magnesium aluminum silicate_____ 20.0
  Methylcellulose _____ 13.3
  Stearic acid_____ 13.3
  Colloidal silica_____ 6.6
  Anhydrous ethanol, q.s.
  Purified water, q.s.

Procedure.—All powders with the exception of the silica and starch are passed through a screen having an opening of 0.6 mm. and mixed well. From the starch and 65 ml. water a paste is formed which is used to granulate the powders together with the ethanol. The wet granulate is passed through a screen with 2 mm. openings and dried overnight at 35°. The dry granulate is broken in a hammer mill, passed through a screen with 1.2 mm. openings and compressed into tablets each weighing 0.65 g., using concave punches with 12 mm. diameter, uppers bisected.

In the analogous manner tablets can be prepared of the compounds shown in the previous examples, especially of the N-phenylmercaptoacetyl-, N-phenylcarbamoyl- and N-(2-furoyl)-carbamoyl-N'-(3-dimethylamino - propyl)-1,3-bis-(4-piperidyl)-propanes. These tablets may be applied only once a day.

Example 40

Preparation of 10,000 capsules each containing 100.0 mg. of the active ingredient:

Formula:    G.
  N - (4 - amino - benzenesulfonyl)-N'-(3-di-
    methylaminopropyl) - 1,3 - bis - (4-piper-
    idyl)-propane _____ 1,000.0
  Lactose _____ 2,800.0
  Talcum powder_____ 200.0

Procedure.—All the powders are passed through a screen with an opening of 0.6 mm. Then the drug substance is placed in a suitable mixer and mixed first with the talcum, then with the lactose until homogenous. No. 1 capsules are filled with 400 mg., using a capsule filling machine. In the analogous manner capsules may be prepared containing the 1,5-bis-[N-(3-dimethylamino-propyl)-4-piperidyl]-pentane tetrahydrochloride or the 1,3-bis-{N-[3-(N-methyl-N-benzylamino)-propyl] - 4 - piperidyl}-propane tetrahydrochloride as the drug substance.

Up to 5 of said capsules may also be used in treating dogs or sheep infested with tapeworms.

Up to 4.0 g. of said formula containing, for example, the 1,3-bis-{N-[3-(N-methyl-N-benzylamino) - propyl]-4-piperidyl}-propane tetrahydrochloride as the drug substance, may also be applied in a single oral drench to sheep infested with tapeworms.

Example 41

The mixture of 4.6 g. 2-methyl-1,2-bis-(4-piperidyl)-propane and 80 ml. of an 8% solution of 2-pyrrolidinoethyl chloride in toluene is refluxed overnight while stirring. It is filtered, the filtrate evaporated in vacuo, the residue taken up in ethyl acetate and the solution acidified with hydrogen chloride in ethyl acetate. The precipitate formed is filtered off and recrystallized from methanol-diethyl ether to yield the 2-methyl-1,2-bis-[N-(2-pyrrolidino-ethyl)-4-piperidyl]-propane tetrahydrochloride of the formula

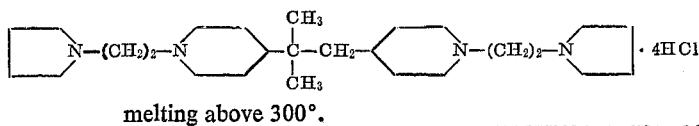

melting above 300°.

The starting material is prepared as follows: To 600 ml. liquid ammonia 10.0 g. ferric oxide and 6.0 g. potassium are added while stirring. After about 40 minutes the deep color of the mixture disappears, whereupon 18.0 g. 4-isopropyl-pyridine are added portionwise and 10 minutes later 19.0 g. 4-chloromethyl-pyridine. The mixture is allowed to evaporate overnight at room temperature. The residue is taken up in 100 ml. water, the mixture extracted with chloroform, the extract dried, filtered and evaporated. The residue is distilled, the fraction boiling at 140–150°/0.6 mm. Hg collected and recrystallized from diethyl ether to yield the 2-methyl-1,2-bis-(4-pyridyl)-propane melting at 43–48°.

The mixture of 10.0 g. thereof, 4.0 g. 10% palladium-charcoal and 120 ml. glacial acetic acid is hydrogenated at 45 p.s.i. and 60° until the theoretical amount of hydrogen is absorbed. It is then filtered, the filtrate evaporated in vacuo and to the residue 15 ml. 50% aqueous sodium hydroxide added. The mixture is extracted with diethyl ether, the extract dried, filtered and evaporated. The residue is distilled and the fraction boiling at 70–90°/0.4 mm. Hg collected, it represents the 2-methyl-1,2-bis-(4-piperidyl)-propane.

Example 42

To the solution of 4.2 g. bis-2-piperidyl-methane and 15 ml. toluene, that of 8.5 g. 3-dimethylamino-propyl chloride in 41 ml. toluene is added and the whole refluxed overnight. The mixture is filtered, the filtrate evaporated in vacuo and the residue taken up in ethyl acetate. The solution is acidified with hydrogen chloride in ethyl acetate, the precipitate formed filtered off and dissolved in water. The solution is made alkaline with 6 N aqueous sodium hydroxide and extracted with ethyl acetate. The extract is washed with water, dried, filtered and evaporated. The residue is again taken up in ethyl acetate, the solution acidified with hydrogen chloride, the precipitate formed filtered off and dried in vacuo, to yield the bis-[N-(3-dimethylamino-propyl)-2-piperidyl]-methane tetrahydrochloride of the formula

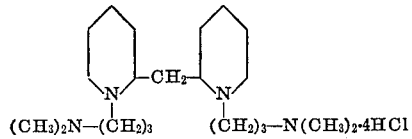

melting at 80–90° with foaming; the corresponding base shows NMR signals at 133 cps. (in deutero-chloroform).

The starting material is prepared as follows: The mixture of 25.0 g. 2,2′-dipyridyl ketone, 200 ml. glacial acetic acid and 9.0 g. 10% palladium on charcoal is hydrogenated at 50 p.s.i. at a temperature rising gradually to 65°. After about 7 hours the theoretical amount of hydrogen has been absorbed and the resulting mixture is cooled and filtered. The filtrate is evaporated in vacuo, the residue made alkaline with 2 N aqueous sodium hydroxide and the mixture extracted with diethyl ether. The extract is washed with water, dried, filtered and evaporated. The residue is distilled and the fraction boiling at 83–92° collected; it represents the bis-2-piperidyl-methane.

Example 43

The solution of 1.5 g. 1,2-bis-[N-(3-dimethylamino-propyl)-4-pyridinium]-ethane dichloride, 25 ml. acetic acid, 2.5 ml. water and 1.0 g. 10% palladium on charcoal is hydrogenated for about 12 hours at 40 p.s.i. and 60°. After that time, the theoretical amount of hydrogen has been absorbed and the cold mixture is filtered. The filtrate is evaporated in vacuo, the residue triturated with ethanol and some hydrogen chloride in ethyl acetate, and filtered off. The residue is recrystallized from methanol to yield the 1,2-bis-[N-(3 - dimethylamino-propyl)-4-piperidyl]-ethane tetrahydrochloride melting at 308° with decomposition; it is identical with the product obtained according to Example 34.

The starting material is prepared as follows: The mixture of 1.3 g. 1,2-bis-(4-pyridyl)-ethane, 2.5 g. 3-dimethylaminopropyl chloride hydrochloride and 10 ml. anhydrous ethanol is heated in a sealed tube for 3 hours to 120°. After cooling, the precipitate formed is filtered off and triturated with isopropanol, to yield the 1,2-bis-[N-(3-dimethylamino-propyl) - 4 - pyridinium]-ethane dichloride melting above 300° with decomposition.

Example 44

To the stirred solution of 3.6 g. N-(3-dimethylamino-propyl)-1,3-bis-(4-piperidyl)-propane in 25 ml. ethyl acetate, the solution of 1.5 g. of phenyl-isocyanate in 25 ml. ethyl acetate is added dropwise during a 5-minute period. The mixture is stirred for two hours at room temperature and made strongly acidic with saturated hydrogen chloride in ethyl acetate. The precipitate formed is filtered off, the residue dissolved in water, the solution filtered and the filtrate washed with diethylether. The aqueous solution is made strongly alkaline with 2 N aqueous sodium hydroxide and extracted with diethyl ether. The extract is dried, filtered and evaporated to yield the N-phenylcarbamoyl - N′ - (3′-dimethylamino-propyl)-1,3-bis(4-piperidyl)-propane of the formula

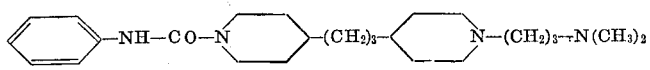

melting at 96–98°.

1 g. thereof is taken up in the minimum amount of ethanol and the solution acidified with ethanolic hydrochloric acid. The precipitate formed is filtered off and recrystallized from methanol-ethyl acetate, to yield the corresponding dihydrochloride melting at 220–225°.

Example 45

Preparation of 1000 tablets each containing 250 mg. of the active ingredient:

| Formula: | G. |
|---|---|
| N-phenylcarbamoyl - N′ - (3-dimethylamino-propyl) - 1,3 - bis-(4-piperidyl)-propane dichloride | 250.0 |
| Wheat starch | 346.8 |
| Magnesium aluminum silicate | 20.0 |
| Methylcellulose | 13.3 |
| Stearic acid | 13.3 |
| Colloidal silica | 6.6 |
| Anhydrous ethanol, q.s. | |
| Purified water, q.s. | |

Procedure—All powders, with the exception of the silica and 96.8 g. of the starch, are passed through a screen having openings of 0.6 mm. and mixed well. From the remaining starch and 65.ml. water a paste is formed which is used to granulate the powders together with the ethanol. The wet granulate is passed through a screen with 2 mm. openings and dried overnight at 35°. The dry granulate is broken in a hammer mill, passed through a screen with 1.2 mm. openings and compressed into tablets each weighing 0.65 g., using concave punches with 12 mm. diameter, uppers quartered.

In the analogous manner, 250 mg. tablets are prepared, containing the N-2-furoyl-N′-(3-dimethylamino-propyl)-1,3-bis-(4-piperidyl)-propane dihydrochloride or maleate as the active ingredient.

Example 46

The mixture of 26.6 g. N-(3-dimethylaminopropyl)-1,3-bis-(4-piperidyl)-propane, 7.1 g. (4-amino-6-phenylamino-1,3,5-triazinyl-2)-methyl chloride (Org. Synth. Coll. Vol. 4, 29; 1963) and 25 ml. ethanol is refluxed for 2 hours while stirring and allowed to stand at room temperature for two days. The precipitate formed is triturated with ethanol, filtered off and recrystallized from isopropanol and isopropanol-hexane, to yield the N-(4-amino-6-phenylamino - 1,3,5 - triazinyl-2-methyl)-N'-(3-dimethylaminopropyl) - 1,3 - bis-(4-piperidyl)-propane of the formula

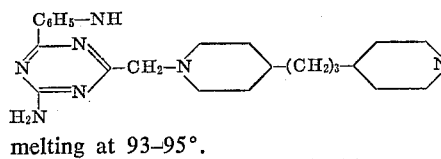

melting at 93–95°.

Example 47

The mixture of 28.5 g. 1,3-bis-(4-piperidyl)-propane, 14.7 g. 3-N-methyl-N-n-butylamino-propyl chloride and 25 ml. toluene is refluxed for 3 hours while stirring. After cooling it is filtered, the residue washed with toluene and the filtrate evaporated in vacuo the residue is taken up in 1500 ml. n-propanol and the solution gassed with hydrogen chloride. The precipitate formed is filtered off, taken up in 6 N aqueous sodium hydroxide and the mixture extracted with diethyl ether. The extract is dried, evaporated, the residue distilled and the fraction boiling at 178–186/0.2 mm. collected, to yield the N-(3-N-methyl-N-n-butylaminopropyl) - 1,3 - bis-(4-piperidyl)-propane of the formula

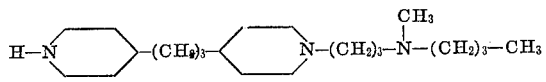

The 1,3-bis-[N-(3 - N -methyl-N-n-butylaminopropyl)-4-piperidyl]-propane is analogously obtained from 6.3 g. bis-(4-piperidyl)-propane and 14.7 g. 3-N-methyl-N-n-butylamino-propyl chloride in 81 ml. toluene. After refluxing overnight, the mixture is filtered, the filtrate evaporated in vacuo, the residue taken up in ethyl acetate and the solution acidified with hydrogen chloride in ethyl acetate. The precipitate formed is filtered off, triturated with 100 ml. hot ethanol and recrystallized from methanol, to yield the corresponding tetrahydrochloride melting above 280°.

EXAMPLE 48

According to the method described in the previous examples, especially Examples 17 and 19 respectively, the following compounds are prepared from equivalent amounts of the corresponding starting material:

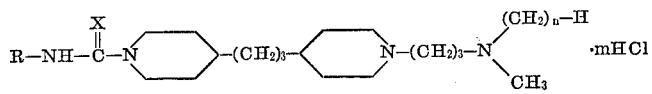

| R | X | n | m | M.P.,° |
|---|---|---|---|---|
| $C_6H_5$ | 0 | 4 | 2 | 217 |
| 4-CN—$C_6H_4$ | 0 | 1 | 2 | [1] 240–242 |
| Benzyl | 0 | 1 | 0 | 97–101 |
| 2-phenethyl | 0 | 1 | 2 | [1] 223–225 |
| 3-$NO_2$—$C_6H_4$ | S | 1 | 2 | [1] 230 |

[1] Decomposition.

Example 49

To the mixture of 14.5 g. N-(3-dimethylaminopropyl)-1,3 - bis-(4-piperidyl)-propane in 100 ml. ethyl acetate, the solution of 2 g. sodium hydroxide in 8 ml. water is added, followed by that of 8.6 g. phenyl-chlorothioformate in 100 ml. ethyl acetate during 40 minutes while stirring. After 2 hours, the organic phase is separated and made acidic with hydrogen chloride in ethyl acetate. The precipitate formed is filtered off, dissolved in water, the solution made alkaline with 6 N aqueous sodium hydroxide and the mixture extracted with diethyl ether. The extract is dried, filtered, and evaporated, to yield the N-phenyl-mercaptoformyl - N' - (3-dimethylaminopropyl)-1,3-bis-(4-piperidyl)-propane of the formula

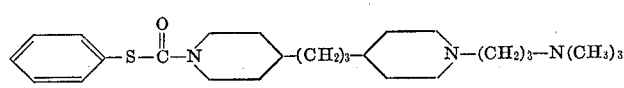

melting at 57–60°. The dihydrochloride thereof is precipitated from a solution in ethyl acetate and recrystallized from ethanol-ethyl acetate; it melts at 257–258° with decomposition.

In the analogous manner, the N-(methoxy-ethoxy or phenoxy) - formyl - N' - (3-dimethylaminopropyl)-1,3-bis-(4-piperidyl)-propane dihydrochlorides are prepared from equivalent amounts of the corresponding starting material, melting at 255–257°, 260–262° and 250–252° respectively (with decomposition).

We claim:
1. A compound of the formula

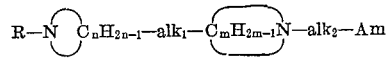

wherein $alk_1$ is alkylene with 1 to 7 carbon atoms, $alk_2$ is alkylene with 2 to 7 carbon atoms, separating Am from the nitrogen atom by at least 2 carbon atoms, each of $C_nH_{2n}$ and $C_mH_{2m}$ is alkylene with 5 to 10 carbon atoms, forming with the nitrogen atom a 6-membered ring, Am is di-lower alkylamino, and R is hydrogen, lower alkyl, 3 to 7 ring-membered cycloalkyl or cycloalkyl-lower alkyl, Ph-$alk_1$-, Hc-$alk_1$-, Ph- or Hc-, or both R and $alk_2$-Am are identical and Am therein is mono- or di-lower alkylamino, Ph-lower alkylamino, N-lower alkyl-N-Ph-lower alkylamino, pyrrolidino, piperidino, 1,4 - pentyleneimino, 2,5- or 1,6-hexyleneimino, 2,6-heptyleneimino, piperazino, N-lower alkyl-piperazino, 3-aza-1,6-hexyleneimino, 3-lower alkyl-3-aza-1,6-hexyleneimino, 4 - aza - 1,7-heptyleneimino, 4-lower alkyl-4-aza-1,7 - heptyleneimino; morpholino, 3,5-dimethylmorpholino or thiamorpholino, in which radicals Ph represents phenyl, (lower alkyl)-phenyl, (lower alkoxy)-phenyl, (halogeno)-phenyl, (trifluoromethyl)-phenyl, (lower alkanoyl) - phenyl, (nitro)-phenyl, (di-lower alkylamino)-phenyl or (sulfamoyl)-phenyl and Hc represents pyridyl, (lower alkyl)-pyridyl, furyl, (lower alkyl)-furyl, (nitro)-furyl, thienyl, (lower alkyl)-thienyl, (nitro)-thienyl, thiazoyl, (lower alkyl)-thiazolyl, (nitro)-thiazolyl or (4-amino-6-phenylamino) - 2 - 1,3,5-triazinyl, the acyl derivatives of the compounds in which R is hydrogen and being derived from unsubstituted lower alkanoic or thioalkanoic acids or such acids substituted by mono-, bi- or tricyclic 3 to 7 ring-member cycloalkyl, cycloalkoxy or cycloalkylmercapto, Ph-alk$_1$-O-, Ph-alk$_1$-S-, Ph-O-, Ph-S- or halogeno, or being derived from formic or thioformic acid substituted by lower alkoxy, lower alkylamino, lower carbalkoxy-lower alkylamino, 3 to 7 ring-membered cycloalkylamino, Ph-amino, Hc-amino, Ph- or Hc-, or being derived from a Ph-sulfonic acid, a lower alkyl quaternary or Ph-lower alkyl quaternary or an acid addition salt thereof.

2. A compound as claimed in claim 1, in which formula alk$_1$ is methylene, 1,2-ethylene or 1,3-propylene, alk$_2$ is 1,2-ethylene, 1,2- or 1,3-propylene, each of $C_nH_{2n}$ and $C_mH_{2m}$ is 1,5-pentylene, Am is di-lower alkylamino, and R is hydrogen, lower alkyl, 3 to 7 ring-membered cycloalkyl or cycloalkyl-lower alkyl, Ph-alk$_1$, Hc-alk$_1$, Ph, Hc, lower alkanoyl, 3 to 7 ring-membered (cycloalkyl, cycloalkoxy or cycloalkylmercapto)-lower alkanoyl, lower alkoxy-formyl, Ph - alk$_1$-O-lower alkanoyl or Ph-alk$_1$-S-lower alkanoyl, Ph-O-lower alkanoyl, Ph-S-lower alkanoyl, mono- or dihalo-lower alkanoyl, 3 to 7 ring-membered cycloalkyl-carbamoyl or -thiocarbamoyl, Ph-formyl, Hc-formyl, Ph-carbamoyl, Ph-thiocarbamoyl, Hc-carbamoyl, Hc-thiocarbamoyl or Ph-sulfonyl or both R and alk$_2$-Am are identical, in which compounds Ph and Hc have the meaning given in claim 2, or an acid addition salt thereof.

3. A compound as claimed in claim 2 and having the formula

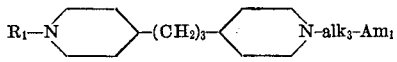

in which alk$_3$ is 1,2-ethylene or 1,3-propylene, Am$_1$ is di-lower alkylamino, and R$_1$ is hydrogen, lower alkyl, alk$_3$-Am$_1$, benzyl, halogenobenzyl, 4 - amino - 6-phenylamino - 1,3,5-triazinyl-2-methyl, phenyl, halogenophenyl, acetylphenyl, 5-nitro-2 - thiazolyl, 3 to 7 ring-membered cycloalkylmethyl, -formyl or -carbamoyl, lower alkanoyl, mono- or dihalogeno - lower alkanoyl, phenoxy-lower alkanoyl, phenylmercapto-lower alkanoyl, phenyl-lower alkanoyl, -carbamoyl or -sulfonyl, (lower alkyl)-phenyl-lower alkanoyl, -carbamyl or -sulfonyl, (mono-, di- or tri-lower alkoxy)-phenyl-lower alkanoyl, -carbamoyl or -sulfonyl, (mono-, di- or trihalogeno) - phenyl-lower alkanoyl, -carbamoyl or -sulfonyl, (trifluoromethyl)-phenyl-lower alkanoyl, -carbamoyl or -sulfonyl, (mono- or di-lower alkanoyl) - phenyl-lower alkanoyl, -carbamoyl or -sulfonyl, (mono- or di-nitro) - phenyl-lower alkanoyl, -carbamoyl or -sulfonyl, (amino)-phenyl-lower alkkanoyl, -carbamoyl or -sulfonyl, (lower alkanoylamino)-phenyl-lower alkanoyl, -carbamoyl or -sulfonyl or (sulfamoyl)-phenyl-lower alkanoyl, -carbamoyl or -sulfonyl, naphthoyl, isonicotinoyl, furoyl, 5-nitro-2-furoyl or thienoyl, or a therapeutically acceptable acid addition salt thereof.

4. A compound as claimed in claim 3, in which formula alk$_3$ is 1,3-propylene, AM$_1$ is N-(methyl, ethyl, n-propyl, n-butyl or benzyl)-N-methylamino and R$_1$ is phenylmercaptoacetyl, benzoyl, 4 - fluorobenzoyl, phenylcarbamoyl, 4-fluorophenylcarbamoyl or 2-furoyl, or a therapeutically acceptable acid addition salt thereof.

5. A compound as claimed in claim 4 and being the N-phenylmercaptoacetyl - N'-(3-dimethylaminopropyl)-1,3-bis-(4-piperidyl)-propane or a therapeutically acceptable acid addition salt thereof.

6. A compound as claimed in claim 4 and being the N - (4 - fluorobenzoyl)-N'-(3-dimethylaminopropyl)-1,3-bis - (4-piperidyl)-propane or a therapeutically acceptable acid addition salt thereof.

7. A compound as claimed in claim 4 and being the N - phenylcarbamoyl - N'-(3-dimethylaminopropyl)-1,3-bis-(4-piperidyl) - propane or therapeutically acceptable acid addition salt thereof.

8. A compound as claimed in claim 4 and being the N - (4 - fluorophenylcarbamyl)-N'-(3 - dimethylaminopropyl)-1,3-bis-(4-piperidyl)-propane or a therapeutically acceptable acid addition salt thereof.

9. A compound as claimed in claim 4 and being the N - 2 - furoyl - N'-(3-dimethylaminopropyl)-1,3-bis-(4-piperidyl)-propane or a therapeutically acceptable acid addition salt thereof.

References Cited
UNITED STATES PATENTS

| | | | |
|---|---|---|---|
| 3,277,101 | 10/1966 | Surrey | 260—294 |
| 3,420,836 | 1/1969 | Brust et al. | 260—293 |

HENRY R. JILES, Primary Examiner

G. T. TODD, Assistant Examiner

U.S. Cl. X.R.

260—239, 243, 247.1, 247.2, 247.5, 249.5, 249.6, 268, 293, 294, 294.7; 424—246, 248, 249, 267

PO-1050
(5/69)

UNITED STATES PATENT OFFICE
CERTIFICATE OF CORRECTION

Patent No. 3,562,281      Dated February 9, 1971

Inventor(s) LINCOLN HARVEY WERNER ET AL

It is certified that error appears in the above-identified patent and that said Letters Patent are hereby corrected as shown below:

Column 29, line 12, change "member" to --- membered ---.

Column 29, line 36, change "2" to --- 1 ---.

Column 30, line 7, change "alkkanoyl" to --- alkanoyl ---.

Column 30, line 14, change "$AM_1$" to --- $Am_1$ ---.

Signed and sealed this 29th day of February 1972.

(SEAL)
Attest:

EDWARD M. FLETCHER, JR.
Attesting Officer

ROBERT GOTTSCHALK
Commissioner of Patents